United States Patent
Chou et al.

(10) Patent No.: US 8,899,911 B2
(45) Date of Patent: Dec. 2, 2014

(54) HEAT-DISSIPATING SYSTEM AND CONTROL METHOD THEREOF

(75) Inventors: Chih-Cheng Chou, Hsin-Chu (TW); Wen-Hsien Su, Hsin-Chu (TW); Tsung-Ching Lin, Hsin-Chu (TW); Chao-Nan Chien, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 356 days.

(21) Appl. No.: 13/549,528

(22) Filed: Jul. 16, 2012

(65) Prior Publication Data
US 2013/0101389 A1 Apr. 25, 2013

(30) Foreign Application Priority Data
Oct. 20, 2011 (CN) .......................... 2011 1 0320511

(51) Int. Cl.
*F04D 25/16* (2006.01)
*F04D 27/00* (2006.01)

(52) U.S. Cl.
CPC ............ *F04D 25/166* (2013.01); *F04D 27/001* (2013.01); *F04D 27/004* (2013.01)
USPC .................... 415/1; 415/16; 415/60; 415/118; 415/119; 416/1; 416/33; 416/47; 416/61; 416/122

(58) Field of Classification Search
USPC .......... 415/1, 16, 60, 118, 119; 416/1, 30, 33, 416/35, 44, 47, 61, 122, 500
See application file for complete search history.

(56) References Cited

U.S. PATENT DOCUMENTS

| | | | | |
|---|---|---|---|---|
| 4,158,527 A * | 6/1979 | Burkett | ............................. | 415/1 |
| 4,225,289 A * | 9/1980 | Burkett | ............................. | 417/3 |
| 6,185,946 B1 * | 2/2001 | Hartman | ......................... | 62/175 |
| 7,179,046 B2 * | 2/2007 | Hopkins | ......................... | 415/61 |
| 7,714,524 B2 | 5/2010 | Frankel et al. | | |
| 7,963,749 B1 * | 6/2011 | Mecozzi | ....................... | 417/309 |
| 8,734,086 B2 * | 5/2014 | Hopkins | ......................... | 415/61 |
| 2005/0180846 A1 * | 8/2005 | Hopkins | ....................... | 415/119 |
| 2007/0081888 A1 * | 4/2007 | Harrison | ........................ | 415/47 |
| 2009/0304119 A1 | 12/2009 | Kuroda et al. | | |
| 2009/0304199 A1 | 12/2009 | DeMoss | | |
| 2011/0014061 A1 * | 1/2011 | Hopkins et al. | .................... | 417/3 |

FOREIGN PATENT DOCUMENTS

| | | |
|---|---|---|
| CN | 1536232 | 10/2004 |
| CN | 101063875 | 10/2007 |
| CN | 101431880 | 5/2009 |
| CN | 102102679 | 6/2011 |
| JP | 2008208806 | 9/2008 |

OTHER PUBLICATIONS

"Office Action of China Counterpart Application", issued on Oct. 8, 2014, p. 1-8.

* cited by examiner

*Primary Examiner* — Igor Kershteyn
(74) *Attorney, Agent, or Firm* — Jianq Chyun IP Office

(57) ABSTRACT

The invention provides a heat-dissipating system and a control method thereof. The heat-dissipating system has a plurality of fans and is configured for adjusting rotation-speeds of the fans. The control method includes following steps: obtaining a plurality of rotation-speed values of the fans; computing out a rotation-speed reference value according to the rotation-speed values; when the rotation-speed reference value is greater than a first threshold value, decreasing the rotation-speeds of the fans through a corresponding fan control signal; when the rotation-speed reference value is less than a second threshold value, increasing the rotation-speeds of the fans through the corresponding fan control signal.

18 Claims, 2 Drawing Sheets ized the fan, the air flow, and the invention.

HEAT-DISSIPATING SYSTEM AND CONTROL METHOD THEREOF

CROSS-REFERENCE TO RELATED APPLICATION

This application claims the priority benefit of China application serial no. 201110320511.8, filed on Oct. 20, 2011. The entirety of the above-mentioned patent application is hereby incorporated by reference herein and made a part of this specification.

BACKGROUND OF THE INVENTION

1. Field of the Invention

The invention generally relates to a heat-dissipating system and a control method thereof, and more particularly, to a heat-dissipating system and a control method thereof able to decrease fan noise and advance heat-dissipating effect.

2. Description of Related Art

During running an electronic apparatus, its internal electronic components, such as the computer's central processing processor (CPU) or the light source in a projector, generate heat. To avoid heat accumulation that causes an excessive temperature inside the electronic apparatus and results in electronic apparatus crash or damaging the electronic components, a heat-dissipating system is required to dissipate heat.

In general, the heat-dissipating system uses at least one fan to create air circulation so as to achieve heat-dissipating effect through the air circulation. However, when the fan is running, in addition to causing air circulation, the fan also generates noise. Therefore, when using the fan for cooling, in addition to considering the cooling effect, the noise generated by the fan is also considered to avoid excessive noise causing the user's discomfort.

When the heat-dissipating system uses more than one fan, the fans are used in parallel way to increase the air-flow. In consideration of cost, these fans are driven by a fan driver, and the fan driver normally controls all the rotation speeds of the fans by taking the rotation-speed of one of these fans as a reference value. However, if the structure of each fan is the same, each fan is operated with an actual operation error, that under the controls of the same control signal, the rotation speed of each fan can not be all the same. Therefore, under the situation where the fan driver uses the rotation-speed of one of the fans as the reference value to control all the rotation speeds of the fans, the fan driver can not accurately control all the rotation speeds of the fans to fall in an allowable speed range. As a result, the integral heat-dissipating capacity of the fans may be too low or the entire noise is too high.

For example, U.S. Pat. No. 7,714,524 discloses a system and a method for controlling multiple D.C. fans, which includes a plurality of motors, a plurality of driving circuits and a processor, in which these motors are used to rotate the corresponding fans, each driving circuit provides a current to the motor to control the rotation-speed of the corresponding fan according to a pulse modulation signal generated by the processor. The processor herein adjusts the rotation-speeds of the motors based on the rotation-speeds detected by speedometers respectively corresponding to each motor.

U.S. Patent Application No. 20090304199 discloses a system of multiple fan acoustic interaction control. The system includes two fans disposed in parallel, a controller and a power supply. The controller monitors the rotation-speeds of the fans through speedometers and adjusts the rotation-speeds of the above-mentioned two fans so as to eliminate the interactive interfered noise generated by the two fans according to the difference between the rotation-speeds of the two fans, in which the controller can adjust the rotation-speeds as per the priorities of the above-mentioned two fans.

SUMMARY OF THE INVENTION

Accordingly, the invention is directed to a heat-dissipating system and a control method thereof, which can accurately control the rotation-speeds of a plurality of fans to be close or equal to a predetermined rotation-speed target value.

Other objectives and advantages of the invention should be further indicated by the disclosures of the invention, and omitted herein for simplicity.

To achieve one of, a part of or all of the above-mentioned objectives, or to achieve other objectives, an embodiment of the invention provides a heat-dissipating system, which includes a plurality of fans, a plurality of rotation-speed detection units, a fan driver and an operation unit. The fans are mutually connected in parallel and the rotation-speed detection units are respectively coupled to the corresponding fans for detecting and outputting a plurality of rotation-speed values corresponding to the fans. The fan driver is coupled to the fans for generating a fan control signal to control rotation-speeds of the fans. The operation unit is coupled to the rotation-speed detection units and the fan driver. The operation unit receives and calculates the rotation-speed values to generate a rotation-speed reference value, wherein the operation unit controls the fan driver to generate the corresponding fan control signal according to the rotation-speed reference value. When the rotation-speed reference value is greater than a first threshold value, the fan driver decreases the rotation-speeds of the fans through the corresponding fan control signal; when the rotation-speed reference value is less than a second threshold value, the fan driver increases the rotation-speeds of the fans through the corresponding fan control signal.

In an embodiment of the present invention, the above-mentioned rotation-speed reference value is an average value of the rotation-speed values.

In an embodiment of the present invention, the above-mentioned rotation-speed reference value is an n-th root of the product of the rotation-speed values, in which n is quantity of the fans.

In an embodiment of the present invention, the above-mentioned fans respectively have a corresponding weight value, and the rotation-speed reference value is a quotient of the sum of the products of the rotation-speed values and the corresponding weight values divided by the sum of all the weight values.

In an embodiment of the present invention, each of the above-mentioned weight values is obtained by computation according to a proportion of heat-dissipating capability and a proportion of noise influence of the corresponding fan in the heat-dissipating system.

In an embodiment of the present invention, the sum of the above-mentioned weight values is 1.

In an embodiment of the present invention, the above-mentioned first threshold value is greater than the second threshold value.

In an embodiment of the present invention, the above-mentioned first threshold value is equal to the second threshold value.

In an embodiment of the present invention, the above-mentioned heat-dissipating system further includes a rotation-speed target value, in which a difference between the rotation-speed target value and the rotation-speed reference value is a rotation-speed adjustment value of the fans and the fan control signal corresponds to the rotation-speed adjustment value for adjusting the rotation-speeds of the fans.

To achieve one of, a part of or all of the above-mentioned objectives, or to achieve other objectives, an embodiment of the invention also provides a control method of a heat-dissipating system, in which the heat-dissipating system has a plurality of fans mutually connected in parallel and the control method includes following steps: obtaining a plurality of rotation-speed values corresponding to the fans; generating a rotation-speed reference value after computing the rotation-speed values; decreasing the rotation-speeds of the fans through a corresponding fan control signal when the rotation-speed reference value is greater than a first threshold value; increasing the rotation-speeds of the fans through the corresponding fan control signal when the rotation-speed reference value is less than a second threshold value, in which the first threshold value is greater than or equal to the second threshold value.

In an embodiment of the present invention, the above-mentioned rotation-speed reference value is an average value of the rotation-speed values.

In an embodiment of the present invention, the above-mentioned rotation-speed reference value is an n-th root of the product of the rotation-speed values, in which n is quantity of the fans.

In an embodiment of the present invention, the above-mentioned fans respectively have a corresponding weight value, and the rotation-speed reference value is a quotient of the sum of the products of the rotation-speed values and the corresponding weight values divided by the sum of all the weight values.

In an embodiment of the present invention, each of the above-mentioned weight values is obtained by computation according to a proportion of heat-dissipating capability and a proportion of noise influence of the corresponding fan in the heat-dissipating system.

In an embodiment of the present invention, the above-mentioned sum of the weight values is 1.

In an embodiment of the present invention, the above-mentioned first threshold value is greater than the second threshold value.

In an embodiment of the present invention, the above-mentioned first threshold value is equal to the second threshold value.

In an embodiment of the present invention, the above-mentioned heat-dissipating system further includes a rotation-speed target value, in which a difference between the rotation-speed target value and the rotation-speed reference value is a rotation-speed adjustment value of the fans and the fan control signal corresponds to the rotation-speed adjustment value for adjusting the rotation-speeds of the fans.

Based on the description above, the heat-dissipating system and the control method thereof in the above-mentioned embodiments of the invention are able to compute out the rotation-speed reference value according to the rotation-speed values of the fans, then, decide whether decreasing the rotation-speeds of the fans according to the judgement of whether the rotation-speed reference value is greater than the first threshold value, and further decide whether increasing the rotation-speeds of the fans according to the judgement of whether the rotation-speed reference value is less than the second threshold value. In this way, the invention can more accurately control the rotation-speeds of the fans to be close to or equal to the predetermined rotation-speed target value of the heat-dissipating system.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
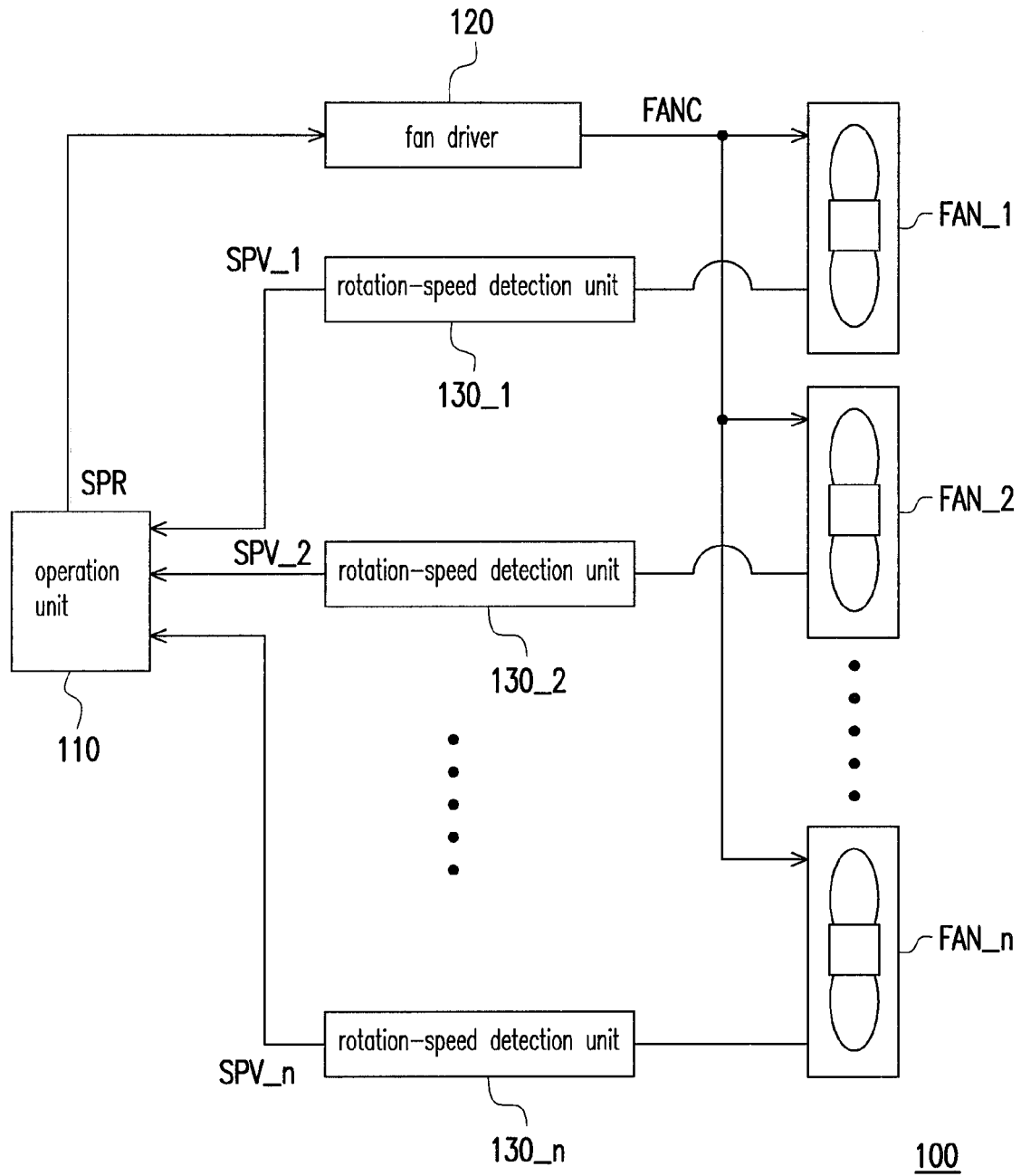
FIG. 1 is a schematic diagram of a heat-dissipating system according to an embodiment of the invention.

FIG. 1 is a schematic diagram of a heat-dissipating system according to an embodiment of the invention. A heat-dissipating system 100 includes a plurality of fans FAN_1-FAN_n, a plurality of rotation-speed detection units 130_1-130_n, a fan driver 120 and an operation unit 110, in which n is a positive integer greater than 1. The fans FAN_1-FAN_n are mutually connected in parallel. The rotation-speed detection units 130_1-130_n are respectively coupled to the corresponding fans (for example, FAN_1-FAN_n) for respectively detecting rotation-speeds of the fans FAN_1-FAN_n and respectively outputting the corresponding rotation-speed values SPV_1-SPV_n. The operation unit 110 is coupled to the rotation-speed detection units 130_1-130_n and the fan driver 120 for receiving and calculating the rotation-speed values SPV_1-SPV_n. The operation unit 110 generates a rotation-speed reference value SPR according to the calculation result of the rotation-speed values SPV_1-SPV_n, in which the rotation-speed reference value SPR is output to the fan driver 120.

The heat-dissipating system further includes a predetermined rotation-speed target value SPS (not shown in the figures). The fan driver 120 is coupled to the fans FAN_1-FAN_n for generating a fan control signal transmitted to the fans FAN_1-FAN_n according to a difference between the rotation-speed reference value SPR and the rotation-speed target value SPS. The corresponding fan control signal FANC can be a voltage value for controlling the rotation-speeds of the fans FAN_1-FAN_n, in which the control of the rotation-speeds of the fans FAN_1-FAN_n can be implemented by using synchronic technique. In more details, when the rotation-speed reference value SPR is greater than the rotation-speed target value SPS (corresponding to a first threshold value L1), the fan driver 120 decreases the rotation-speeds of the fans FAN_1-FAN_n through the corresponding fan control signal FANC; when the rotation-speed reference value SPR is less than the rotation-speed target value SPS (corresponding to a second threshold value L2), the fan driver 120 increases the rotation-speeds of the fans FAN_1-FAN_n through the corresponding fan control signal FANC. In the embodiment, the first threshold value L1 is equal to the second threshold value L2, i.e., the rotation-speed target value SPS. The difference between the rotation-speed target value SPS and the rotation-speed reference value SPR is a rotation-speed adjustment value of the fans FAN_1-FAN_n.

In the embodiment, the operation unit 110 can obtain the rotation-speed reference value SPR in different computations, in which one of the computations is that the rotation-speed reference value SPR is the average value of the rotation-speed values SPV_1-SPV_n through the following Formula:

$$SPR = \frac{\sum_{i=1}^{n} SPV\_i}{n} \quad (1)$$

wherein n is quantity of the fans FAN_1-FAN_n. The fan driver 120 generates a corresponding fan control signal FANC to adjust the rotation-speeds of the fans FAN_1-FAN_n according to the difference between the rotation-speed reference value SPR and the rotation-speed target value SPS. On the other hand, the corresponding fan control signal FANC generated by the fan driver 120 according to the difference between the rotation-speed reference value SPR and the rotation-speed target value SPS adjusts the rotation-speeds of the fans FAN_1-FAN_n by using the synchronic technique.

For example, the heat-dissipating system 100 has two fans FAN_1 and FAN_2 disposed therein for description simplicity, i.e., n is set as 2, which the invention is not limited to. Assuming the rotation-speed target value SPS of the two fans FAN_1 and FAN_2 is 5000 rpm (represented in 100% in the following description) and an error tolerance value of the fans FAN_1 and FAN_2 is predetermined, for example, as 10%. When both the rotation-speed values SPV_1 and SPV_2 respectively corresponding to the fans FAN_1 and FAN_2 are 100% (i.e., both the rotation-speeds of the fans FAN_1 and FAN_2 are 5000 rpm), the average value thereof (the rotation-speed reference value SPR) after the computation of Formula (1) is 100% as well (5000 rpm). At the time, the rotation-speed reference value SPR is equal to the rotation-speed target value SPS, and thus, the fan driver 120 just remains the current rotation-speeds of the fans FAN_1 and FAN_2 and the rotation-speed adjustment value SPA at the time is 0.

When the rotation-speed value SPV_1 is 110% (i.e., the rotation-speed of the fan FAN_1 is 5500 rpm) and the rotation-speed value SPV_2 is 90% (i.e., the rotation-speed of the fan FAN_2 is 4500 rpm), or the rotation-speed value SPV_1 is 90% and the rotation-speed value SPV_2 is 110%, the average value thereof (the rotation-speed reference value SPR) would be 100% after the computation of Formula (1). At the time, the rotation-speed reference value SPR is equal to the rotation-speed target value SPS and the fan driver 120 just remains the current rotation-speeds of the fans FAN_1 and FAN_2 and the rotation-speed adjustment value SPA at the time is 0.

When both the rotation-speed values SPV_1 and SPV_2 are 110% (i.e., both the rotation-speeds of the fans FAN_1 and FAN_2 are 5500 rpm), the average value thereof (the rotation-speed reference value SPR) would be 110% after the computation of Formula (1). At the time, the rotation-speed reference value SPR is greater than the rotation-speed target value SPS and the fan driver 120 would simultaneously decrease the rotation-speeds of the fans FAN_1 and FAN_2 through the corresponding fan control signal FANC, in which the rotation-speed adjustment value of the fans FAN_1 and FAN_2 is the difference between the rotation-speed target value SPS (100%) and the rotation-speed reference value SPR (110%), so that both the rotation-speeds of the fans FAN_1 and FAN_2 are decreased by 500 rpm (10% of the rotation-speed target value SPS).

When both the rotation-speed values SPV_1 and SPV_2 are 90% (i.e., both the rotation-speeds of the fans FAN_1 and FAN_2 are 4500 rpm), the average value thereof (the rotation-speed reference value SPR) would be 90% after the computation of Formula (1). At the time, the rotation-speed reference value SPR is less than the rotation-speed target value SPS and the fan driver 120 would simultaneously increase the rotation-speeds of the fans FAN_1 and FAN_2 through the corresponding fan control signal FANC, in which the rotation-speed adjustment value SPA of the fans FAN_1 and FAN_2 is the difference between the rotation-speed target value SPS (100%) and the rotation-speed reference value SPR (90%), so that both the rotation-speeds of the fans FAN_1 and FAN_2 are increased by 500 rpm (10% of the rotation-speed target value SPS).

When the rotation-speed value SPV_1 is 100% (i.e., the rotation-speed of the fan FAN_1 is 5000 rpm) and the rotation-speed value SPV_2 is 90% (i.e., the rotation-speed of the fan FAN_2 is 4500 rpm), the average value thereof (the rotation-speed reference value SPR) would be 95% after the computation of Formula (1). At the time, the rotation-speed reference value SPR is less than the rotation-speed target value SPS and the fan driver 120 would simultaneously increase the rotation-speeds of the fans FAN_1 and FAN_2 through the corresponding fan control signal FANC, in which the rotation-speed adjustment value SPA of the fans FAN_1 and FAN_2 is the difference between the rotation-speed target value SPS (100%) and the rotation-speed reference value SPR (95%), so that both the rotation-speeds of the fans FAN_1 and FAN_2 are increased by 250 rpm (5% of the rotation-speed target value SPS).

On the other hand, in the embodiment, the rotation-speed reference value SPR can be the n-th root of the product of the rotation-speed values SPV_1-SPV_n through the following Formula:

$$SPR = \sqrt[n]{\prod_{i=1}^{n} SPV\_i} \quad (2)$$

wherein n is quantity of the fans FAN_1-FAN_n. The fan driver 120 generates a corresponding fan control signal FANC to adjust the rotation-speeds of the fans FAN_1-FAN_n according to the difference between the rotation-speed reference value SPR and the rotation-speed target value SPS.

For example, the heat-dissipating system 100 has two fans FAN_1 and FAN_2 disposed therein for description simplicity, i.e., n is set as 2, which the invention is not limited to. Assuming the standard rotation-speeds are 5000 rpm (i.e., the rotation-speed target value SPS represented in 100% in the following description) and the error tolerance value of the fans FAN_1 and FAN_2 is predetermined, for example, as 10%. When both the rotation-speed values SPV_1 and SPV_2 respectively corresponding to the fans FAN_1 and FAN_2 are 100% (i.e., both the rotation-speeds of the fans FAN_1 and FAN_2 are 5000 rpm), the rotation-speed reference value SPR after the computation of Formula (2) is 100% (5000 rpm). At the time, the rotation-speed reference value SPR is equal to the rotation-speed target value SPS, and thus, the fan driver 120 would remain the current rotation-speeds of the fans FAN_1 and FAN_2 and the rotation-speed adjustment value SPA at the time is 0.

When the rotation-speed value SPV_1 is 110% (i.e., the rotation-speed of the fan FAN_1 is 5500 rpm) and the rotation-speed value SPV_2 is 90% (i.e., the rotation-speed of the fan FAN_2 is 4500 rpm), or the rotation-speed value SPV_1 is 90% and the rotation-speed value SPV_2 is 110%, the rotation-speed reference value SPR thereof would be roughly 99.5% after the computation of Formula (2). At the time, the rotation-speed reference value SPR is less than the rotation-speed target value SPS and the fan driver 120 would simultaneously increase the rotation-speeds of the fans FAN_1 and FAN_2 through the corresponding fan control signal FANC, in which the rotation-speed adjustment value SPA of the fans FAN_1 and FAN_2 is the difference between the rotation-speed target value SPS (100%) and the rotation-speed reference value SPR (99.5%), so that both the rotation-speeds of the fans FAN_1 and FAN_2 are increased by 25 rpm (0.5% of the rotation-speed target value SPS).

When both the rotation-speed values SPV_1 and SPV_2 are 110% (i.e., both the rotation-speeds of the fans FAN_1 and FAN_2 are 5500 rpm), the rotation-speed reference value SPR after the computation of Formula (2) is 110%. At the time, the rotation-speed reference value SPR is greater than the rotation-speed target value SPS, and thus, the fan driver 120 would simultaneously decrease the rotation-speeds of the fans FAN_1 and FAN_2 through the corresponding fan control signal FANC, in which the rotation-speed adjustment value SPA of the fans FAN_1 and FAN_2 is the difference between the rotation-speed target value SPS (100%) and the rotation-speed reference value SPR (110%), so that both the rotation-speeds of the fans FAN_1 and FAN_2 are decreased by 500 rpm (10% of the rotation-speed target value SPS).

When both the rotation-speed values SPV_1 and SPV_2 are 90% (i.e., both the rotation-speeds of the fans FAN_1 and FAN_2 are 4500 rpm), the rotation-speed reference value SPR would be 90% after the computation of Formula (2). At the time, the rotation-speed reference value SPR is less than the rotation-speed target value SPS and the fan driver 120 would simultaneously increase the rotation-speeds of the fans FAN_1 and FAN_2 through the corresponding fan control signal FANC, in which the rotation-speed adjustment value SPA of the fans FAN_1 and FAN_2 is the difference between the rotation-speed target value SPS (100%) and the rotation-speed reference value SPR (90%), so that both the rotation-speeds of the fans FAN_1 and FAN_2 are increased by 500 rpm (10% of the rotation-speed target value SPS).

When the rotation-speed value SPV_1 is 100% (i.e., the rotation-speed of the fan FAN_1 is 5000 rpm) and the rotation-speed value SPV_2 is 90% (i.e., the rotation-speed of the fan FAN_2 is 4500 rpm), the rotation-speed reference value SPR would be roughly 95% after the computation of Formula (2). At the time, the rotation-speed reference value SPR is less than the rotation-speed target value SPS and the fan driver 120 would simultaneously increase the rotation-speeds of the fans FAN_1 and FAN_2 through the corresponding fan control signal FANC, in which the rotation-speed adjustment value SPA of the fans FAN_1 and FAN_2 is the difference between the rotation-speed target value SPS (100%) and the rotation-speed reference value SPR (95%), so that both the rotation-speeds of the fans FAN_1 and FAN_2 are increased by 250 rpm (5% of the rotation-speed target value SPS).

Further, in the embodiment, the fans respectively have a weight value and the rotation-speed reference value SPR can be the quotient of the sum of the products of the rotation-speed values and the corresponding weight values divided by the sum of all the weight values computed by the following Formula:

$$SPR = \frac{\sum_{i=1}^{n} SPV\_i \times Pi}{\sum_{i=1}^{n} Pi} \quad (3)$$

wherein n is quantity of the fans FAN_1-FAN_n and Pi is the weight value corresponding to each of the rotation-speed values SPV_1-SPV_n. Each weight value Pi is the weight values respectively corresponding to each of the rotation-speed values SPV_1-SPV_n and obtained by computation according to the proportion of the heat-dissipating capability of the corresponding fan (for example, fans FAN_1-FAN_n) and the proportion of the noise influence thereof in the heat-dissipating system 100. The fan driver 120 generates a corresponding fan control signal FANC to adjust the rotation-speeds of the fans FAN_1-FAN_n according to the difference between the rotation-speed reference value SPR and the rotation-speed target value SPS. The sum of all the above-mentioned weight values Pi (i.e., $$\sum_{i=1}^{n} Pi \Bigg)$$

can be set as 1 for computation simplicity, which the invention is not limited to.

For example, the heat-dissipating system 100 has two fans FAN_1 and FAN_2 disposed therein for description simplicity, i.e., n is set as 2, which the invention is not limited to. Assuming the rotation-speed standard value SPS (i.e. rotation-speed target value SPS) of the fans FAN_1 and FAN_2 is 5000 rpm (represented in 100% in the following) and the error tolerance value of the fans FAN_1 and FAN_2 is predetermined, for example, as 10%, in which the weight value corresponding to the rotation-speed value SPV_1 is set as 0.6 and the weight value corresponding to the rotation-speed value SPV_2 is set as 0.4. When both the rotation-speed values SPV_1 and SPV_2 respectively corresponding to the fans FAN_1 and FAN_2 are 100% (i.e., both the rotation-speeds of the fans FAN_1 and FAN_2 are 5000 rpm), the rotation-speed reference value SPR after the computation of Formula (3) is 100% (i.e., 5000 rpm). At the time, the rotation-speed reference value SPR is equal to the rotation-speed target value SPS, and thus, the fan driver 120 would remain the current rotation-speeds of the fans FAN_1 and FAN_2 and the rotation-speed adjustment value SPA at the time is 0.

When the rotation-speed value SPV_1 is 110% (i.e., the rotation-speed of the fan FAN_1 is 5500 rpm) and the rotation-speed value SPV_2 is 90% (i.e., the rotation-speed of the fan FAN_2 is 4500 rpm), the rotation-speed reference value SPR after the computation of Formula (3) is 102%. At the time, the rotation-speed reference value SPR is greater than the rotation-speed target value SPS and the fan driver 120 would simultaneously decrease the rotation-speeds of the fans FAN_1 and FAN_2 through the corresponding fan control signal FANC, in which the rotation-speed adjustment value SPA of the fans FAN_1 and FAN_2 is the difference between the rotation-speed target value SPS (100%) and the rotation-speed reference value SPR (102%), so that both the rotation-speeds of the fans FAN_1 and FAN_2 are decreased by 100 rpm (2% of the rotation-speed target value SPS).

When the rotation-speed value SPV_1 is 90% (i.e., the rotation-speed of the fan FAN_1 is 4500 rpm) and the rotation-speed value SPV_2 is 110% (i.e., the rotation-speed of the fan FAN_2 is 5500 rpm), the rotation-speed reference value SPR after the computation of Formula (3) is 98%. At the time, the rotation-speed reference value SPR is less than the rotation-speed target value SPS and the fan driver 120 would simultaneously increase the rotation-speeds of the fans FAN_1 and FAN_2 through the corresponding fan control signal FANC, in which the rotation-speed adjustment value SPA of the fans FAN_1 and FAN_2 is the difference between the rotation-speed target value SPS (100%) and the rotation-speed reference value SPR (98%), so that both the rotation-speeds of the fans FAN_1 and FAN_2 are increased by 100 rpm (2% of the rotation-speed target value SPS).

When both the rotation-speed values SPV_1 and SPV_2 are 110% (i.e., both the rotation-speeds of the fans FAN_1 and FAN_2 are 5500 rpm), the rotation-speed reference value SPR after the computation of Formula (3) is 110%. At the time, the rotation-speed reference value SPR is greater than the rotation-speed target value SPS, and thus, the fan driver 120 would simultaneously decrease the rotation-speeds of the fans FAN_1 and FAN_2 through the corresponding fan control signal FANC, in which the rotation-speed adjustment value SPA of the fans FAN_1 and FAN_2 is the difference between the rotation-speed target value SPS (100%) and the rotation-speed reference value SPR (110%), so that both the rotation-speeds of the fans FAN_1 and FAN_2 are decreased by 500 rpm (10% of the rotation-speed target value SPS).

When both the rotation-speed values SPV_1 and SPV_2 are 90% (i.e., both the rotation-speeds of the fans FAN_1 and FAN_2 are 4500 rpm), the rotation-speed reference value SPR after the computation of Formula (3) is 90%. At the time, the rotation-speed reference value SPR is less than the rotation-speed target value SPS, and thus, the fan driver 120 would simultaneously increase the rotation-speeds of the fans FAN_1 and FAN_2 through the corresponding fan control signal FANC, in which the rotation-speed adjustment value SPA of the fans FAN_1 and FAN_2 is the difference between the rotation-speed target value SPS (100%) and the rotation-speed reference value SPR (90%), so that both the rotation-speeds of the fans FAN_1 and FAN_2 are increased by 500 rpm (10% of the rotation-speed target value SPS).

When the rotation-speed value SPV_1 is 100% (i.e., the rotation-speed of the fan FAN_1 is 5000 rpm) and the rotation-speed value SPV_2 is 90% (i.e., the rotation-speed of the fan FAN_2 is 4500 rpm), the rotation-speed reference value SPR after the computation of Formula (3) is 96%. At the time, the rotation-speed reference value SPR is less than the rotation-speed target value SPS and the fan driver 120 would simultaneously increase the rotation-speeds of the fans FAN_1 and FAN_2 through the corresponding fan control signal FANC, in which the rotation-speed adjustment value SPA of the fans FAN_1 and FAN_2 is the difference between the rotation-speed target value SPS (100%) and the rotation-speed reference value SPR (96%), so that both the rotation-speeds of the fans FAN_1 and FAN_2 are increased by 200 rpm (4% of the rotation-speed target value SPS), wherein the adjustments and the results thereof in the above-mentioned embodiments are summarised in Table 1, in which '−' means decreasing the rotation-speed and '+' means increasing the rotation-speed.

TABLE 1

| rotation-speed value SPV_1 | rotation-speed value SPV_2 | rotation-speed reference value SPR | | rotation-speed target value SPS | rotation-speed adjustment value SPA |
|---|---|---|---|---|---|
| 100% | 100% | Formula (1) | 100% | 100% | 0 |
|  |  | Formula (2) | 100% |  | 0 |
|  |  | Formula (3) | 100% |  | 0 |
| 110% | 90% | Formula (1) | 100% |  | 0 |
|  |  | Formula (2) | 99.5% |  | +0.5% |
|  |  | Formula (3) | 102% |  | −2% |
| 90% | 110% | Formula (1) | 100% |  | 0 |
|  |  | Formula (2) | 99.5% |  | +0.5% |
|  |  | Formula (3) | 98% |  | +2% |
| 110% | 110% | Formula (1) | 110% |  | −10% |
|  |  | Formula (2) | 110% |  | −10% |
|  |  | Formula (3) | 110% |  | −10% |
| 90% | 90% | Formula (1) | 90% |  | +10% |
|  |  | Formula (2) | 90% |  | +10% |
|  |  | Formula (3) | 90% |  | +10% |
| 100% | 90% | Formula (1) | 95% |  | +5% |
|  |  | Formula (2) | 95% |  | +5% |
|  |  | Formula (3) | 96% |  | +4% |

In the above-mentioned embodiment, the fan driver 120 decides to increase or decrease the rotation-speeds of the fans FAN_1-FAN_n (corresponding to the situation that the first threshold value is equal to the second threshold value) according to the difference between the rotation-speed target value SPS and the rotation-speed reference value SPR. However, when the rotation-speed reference value SPR is close to, but not equal to, the rotation-speed target value SPS, the oscillation of the rotation-speed reference value SPR may cause the fan driver 120 ceaselessly correcting the rotation-speeds of the fans FAN_1-FAN_n and bring up an additional burden for the heat-dissipating system 100. Therefore, in another embodiment of the invention, a predetermined first threshold value L1 (i.e., the upper-limitation tolerance value) and a predetermined second threshold value L2 (i.e., the lower-limitation tolerance value) are used to decide whether or not decreasing the rotation-speeds of the fans FAN_1-FAN_n and whether or not increasing the rotation-speeds of the fans FAN_1-FAN_n, in which the first threshold value L1 is greater than the second threshold value L2 and the rotation-speed standard value SPS (i.e. rotation-speed target value SPS) is between the first threshold value L1 and the second threshold value L2.

In more details, when the rotation-speed reference value SPR is greater than the first threshold value L1, the fan driver 120 decreases the rotation-speeds of the fans FAN_1-FAN_n through the corresponding fan control signal FANC. When the rotation-speed reference value SPR is less than the second threshold value L2, the fan driver 120 increases the rotation-speeds of the fans FAN_1-FAN_n through the corresponding fan control signal FANC. The rotation-speed adjustment value SPA of the fans FAN_1 and FAN_2 is the difference between the rotation-speed reference value SPR and the rotation-speed target value SPS.

In order to follow the previous embodiment for computing out the rotation-speed reference value SPR by using Formula (1), for description simplicity, the heat-dissipating system 100 employs two fans FAN_1 and FAN_2 only therein, i.e., n is set as 2, which the invention is not limited to. Assuming the rotation-speed standard value SPS of the fans FAN_1 and FAN_2 is 5000 rpm (represented in 100%), the error tolerance value of the fans FAN_1 and FAN_2 is 10%, and the first threshold value L1 and the second threshold value L2 are respectively set as 103% and 97%. When both the rotation-speed values SPV_1 and SPV_2 of the fans FAN_1 and FAN_2 are 100% (both the rotation-speeds of the fans FAN_1 and FAN_2 are 5000 rpm), the average value thereof (rotation-speed reference value SPR) is 100% after the computation through Formula (1) as well, which means both the rotation-speeds of the fans FAN_1 and FAN_2 are 5000 rpm. Since the rotation-speed reference value SPR at the time is not greater than the first threshold value L1 and not less than the second threshold value L2, the fan driver 120 remains the current rotation-speeds of the fans FAN_1 and FAN_2 unchanged, i.e., the rotation-speed adjustment value SPA is 0.

When the rotation-speed value SPV_1 is 110% (i.e., the rotation-speed of the fan FAN_1 is 5500 rpm) and the rotation-speed value SPV_2 is 90% (i.e., the rotation-speed of the fan FAN_2 is 4500 rpm), or the rotation-speed value SPV_1 is 90% and the rotation-speed value SPV_2 is 110%, the average value thereof (the rotation-speed reference value SPR) would be 100% after the computation of Formula (1). Since the rotation-speed reference value SPR is not greater than the first threshold value L1 and not less than the second threshold value L2, the fan driver 120 just remains the current rotation-speeds of the fans FAN_1 and FAN_2 and the rotation-speed adjustment value SPA at the time is 0.

When both the rotation-speed values SPV_1 and SPV_2 are 110% (i.e., both the rotation-speeds of the fans FAN_1 and FAN_2 are 5500 rpm), the average value thereof (the rotation-speed reference value SPR) would be 110% after the computation of Formula (1). At the time, the rotation-speed reference value SPR is greater than the first threshold value L1 and the fan driver 120 would simultaneously decrease the rotation-speeds of the fans FAN_1 and FAN_2 through the corresponding fan control signal FANC, in which the rotation-speed adjustment value of the fans FAN_1 and FAN_2 is the difference between the rotation-speed target value SPS (100%) and the rotation-speed reference value SPR (110%), so that both the rotation-speeds of the fans FAN_1 and FAN_2 are decreased by 500 rpm (10% of the rotation-speed target value SPS).

When both the rotation-speed values SPV_1 and SPV_2 are 90% (i.e., both the rotation-speeds of the fans FAN_1 and FAN_2 are 4500 rpm), the average value thereof (the rotation-speed reference value SPR) would be 90% after the computation of Formula (1). At the time, the rotation-speed reference value SPR is less than the second threshold value L2 and the fan driver 120 would simultaneously increase the rotation-speeds of the fans FAN_1 and FAN_2 through the corresponding fan control signal FANC, in which the rotation-speed adjustment value SPA of the fans FAN_1 and FAN_2 is the difference between the rotation-speed target value SPS (100%) and the rotation-speed reference value SPR (90%), so that both the rotation-speeds of the fans FAN_1 and FAN_2 are increased by 500 rpm (10% of the rotation-speed target value SPS).

When the rotation-speed value SPV_1 is 100% (i.e., the rotation-speed of the fan FAN_1 is 5000 rpm) and the rotation-speed value SPV_2 is 90% (i.e., the rotation-speed of the fan FAN_2 is 4500 rpm), the average value thereof (the rotation-speed reference value SPR) would be 95% after the computation of Formula (1). At the time, the rotation-speed reference value SPR is less than the second threshold value L2 and the fan driver 120 would simultaneously increase the rotation-speeds of the fans FAN_1 and FAN_2 through the corresponding fan control signal FANC, in which the rotation-speed adjustment value SPA of the fans FAN_1 and FAN_2 is the difference between the rotation-speed target value SPS (100%) and the rotation-speed reference value SPR (95%), so that both the rotation-speeds of the fans FAN_1 and FAN_2 are increased by 250 rpm (5% of the rotation-speed target value SPS).

On the other hand, the rotation-speed reference value SPR can be obtained after the computation of Formula (2). For example, the heat-dissipating system 100 has two fans FAN_1 and FAN_2 disposed therein for description simplicity, i.e., n is set as 2, which the invention is not limited to. Assuming the rotation-speed standard value SPS is 5000 rpm (i.e., represented in 100% in the following) and the error tolerance value of the fans FAN_1 and FAN_2 is predetermined, for example, as 10%, the first threshold value L1 is set as 103% and the second threshold value L2 is set as 97%. When both the rotation-speed values SPV_1 and SPV_2 of the fans FAN_1 and FAN_2 are 100% (i.e., both the rotation-speeds of the fans FAN_1 and FAN_2 are 5000 rpm), the rotation-speed reference value SPR after the computation of Formula (2) is 100% (5000 rpm). At the time, the rotation-speed reference value SPR is not greater than the first threshold value L1 and not less than the second threshold value L2, and thus, the fan driver 120 would remain the current rotation-speeds of the fans FAN_1 and FAN_2 and the rotation-speed adjustment value SPA at the time is 0.

When the rotation-speed value SPV_1 is 110% (i.e., the rotation-speed of the fan FAN_1 is 5500 rpm) and the rotation-speed value SPV_2 is 90% (i.e., the rotation-speed of the fan FAN_2 is 4500 rpm), or the rotation-speed value SPV_1 is 90% and the rotation-speed value SPV_2 is 110%, the rotation-speed reference value SPR thereof would be roughly 99.5% after the computation of Formula (2). At the time, the rotation-speed reference value SPR is not greater than the first threshold value L1 and not less than the second threshold value L2, and the fan driver 120 would remain the current rotation-speeds of the fans FAN_1 and FAN_2 and the rotation-speed adjustment value SPA at the time is 0.

When both the rotation-speed values SPV_1 and SPV_2 are 110% (i.e., both the rotation-speeds of the fans FAN_1 and FAN_2 are 5500 rpm), the rotation-speed reference value SPR after the computation of Formula (2) is 110%. At the time, the rotation-speed reference value SPR is greater than the first threshold value L1, and thus, the fan driver 120 would simultaneously decrease the rotation-speeds of the fans FAN_1 and FAN_2 through the corresponding fan control signal FANC, in which the rotation-speed adjustment value SPA of the fans FAN_1 and FAN_2 is the difference between the rotation-speed target value SPS (100%) and the rotation-speed reference value SPR (110%), so that both the rotation-speeds of the fans FAN_1 and FAN_2 are decreased by 500 rpm (10% of the rotation-speed target value SPS).

When both the rotation-speed values SPV_1 and SPV_2 are 90% (i.e., both the rotation-speeds of the fans FAN_1 and FAN_2 are 4500 rpm), the rotation-speed reference value SPR would be 90% after the computation of Formula (2). At the time, the rotation-speed reference value SPR is less than the second threshold value L2 and the fan driver 120 would simultaneously increase the rotation-speeds of the fans FAN_1 and FAN_2 through the corresponding fan control signal FANC, in which the rotation-speed adjustment value SPA of the fans FAN_1 and FAN_2 is the difference between the rotation-speed target value SPS (100%) and the rotation-speed reference value SPR (90%), so that both the rotation-speeds of the fans FAN_1 and FAN_2 are increased by 500 rpm (10% of the rotation-speed target value SPS).

When the rotation-speed value SPV_1 is 100% (i.e., the rotation-speed of the fan FAN_1 is 5000 rpm) and the rotation-speed value SPV_2 is 90% (i.e., the rotation-speed of the fan FAN_2 is 4500 rpm), the rotation-speed reference value SPR would be roughly 95% after the computation of Formula (2). At the time, the rotation-speed reference value SPR is less than the second threshold value L2 and the fan driver 120 would simultaneously increase the rotation-speeds of the fans FAN_1 and FAN_2 through the corresponding fan control signal FANC, in which the rotation-speed adjustment value SPA of the fans FAN_1 and FAN_2 is the difference between the rotation-speed target value SPS (100%) and the rotation-speed reference value SPR (95%), so that both the rotation-speeds of the fans FAN_1 and FAN_2 are increased by 250 rpm (5% of the rotation-speed target value SPS).

Further, the rotation-speed reference value SPR can be obtained by computation of Formula (3). For example, the heat-dissipating system 100 has two fans FAN_1 and FAN_2 disposed therein for description simplicity, i.e., n is set as 2, which the invention is not limited to. Assuming the rotation-speed target value SPS of the fans FAN_1 and FAN_2 is 5000 rpm (represented in 100% in the following) and the error tolerance value of the fans FAN_1 and FAN_2 is predetermined, for example, as 10%, and the first threshold value L1 is set as 103% and the second threshold value L2 is set as 97%, in which the weight value corresponding to the rotation-speed value SPV_1 is set as 0.6 and the weight value corresponding to the rotation-speed value SPV_2 is set as 0.4. When both the rotation-speed values SPV_1 and SPV_2 respectively corresponding to the fans FAN_1 and FAN_2 are 100% (i.e., both the rotation-speeds of the fans FAN_1 and FAN_2 are 5000 rpm), the rotation-speed reference value SPR after the computation of Formula (3) is 100% (i.e., 5000 rpm). At the time, the rotation-speed reference value SPR is not greater than the first threshold value L1 and not less than the second threshold value L2, and thus, the fan driver 120 would remain the current rotation-speeds of the fans FAN_1 and FAN_2 and the rotation-speed adjustment value SPA at the time is 0.

When the rotation-speed value SPV_1 is 110% (i.e., the rotation-speed of the fan FAN_1 is 5500 rpm) and the rotation-speed value SPV_2 is 90% (i.e., the rotation-speed of the fan FAN_2 is 4500 rpm), the rotation-speed reference value SPR thereof would be roughly 102% after the computation of Formula (3). At the time, the rotation-speed reference value SPR is not greater than the first threshold value L1 and not less than the second threshold value L2, and the fan driver 120 would remain the current rotation-speeds of the fans FAN_1 and FAN_2 and the rotation-speed adjustment value SPA at the time is 0.

When the rotation-speed value SPV_1 is 90% (i.e., the rotation-speed of the fan FAN_1 is 4500 rpm) and the rotation-speed value SPV_2 is 110% (i.e., the rotation-speed of the fan FAN_2 is 5500 rpm), the rotation-speed reference value SPR after the computation of Formula (3) is 98%. At the time, the rotation-speed reference value SPR is not greater than the first threshold value L1 and not less than the second threshold value L2, and the fan driver 120 would remain the current rotation-speeds of the fans FAN_1 and FAN_2 and the rotation-speed adjustment value SPA at the time is 0.

When both the rotation-speed values SPV_1 and SPV_2 are 110% (i.e., both the rotation-speeds of the fans FAN_1 and FAN_2 are 5500 rpm), the rotation-speed reference value SPR after the computation of Formula (3) is 110%. At the time, the rotation-speed reference value SPR is greater than the first threshold value L1, and thus, the fan driver 120 would simultaneously decrease the rotation-speeds of the fans FAN_1 and FAN_2 through the corresponding fan control signal FANC, in which the rotation-speed adjustment value SPA of the fans FAN_1 and FAN_2 is the difference between the rotation-speed target value SPS (100%) and the rotation-speed reference value SPR (110%), so that both the rotation-speeds of the fans FAN_1 and FAN_2 are decreased by 500 rpm (10% of the rotation-speed target value SPS).

When both the rotation-speed values SPV_1 and SPV_2 are 90% (i.e., both the rotation-speeds of the fans FAN_1 and FAN_2 are 4500 rpm), the rotation-speed reference value SPR after the computation of Formula (3) is 90%. At the time, the rotation-speed reference value SPR is less than the second threshold value L2, and thus, the fan driver 120 would simultaneously increase the rotation-speeds of the fans FAN_1 and FAN_2 through the corresponding fan control signal FANC, in which the rotation-speed adjustment value SPA of the fans FAN_1 and FAN_2 is the difference between the rotation-speed target value SPS (100%) and the rotation-speed reference value SPR (90%), so that both the rotation-speeds of the fans FAN_1 and FAN_2 are increased by 500 rpm (10% of the rotation-speed target value SPS).

When the rotation-speed value SPV_1 is 100% (i.e., the rotation-speed of the fan FAN_1 is 5000 rpm) and the rotation-speed value SPV_2 is 90% (i.e., the rotation-speed of the fan FAN_2 is 4500 rpm), the rotation-speed reference value SPR after the computation of Formula (3) is 96%. At the time, the rotation-speed reference value SPR is less than the second threshold value L2 and the fan driver 120 would simultaneously increase the rotation-speeds of the fans FAN_1 and FAN_2 through the corresponding fan control signal FANC, in which the rotation-speed adjustment value SPA of the fans FAN_1 and FAN_2 is the difference between the rotation-speed target value SPS (100%) and the rotation-speed reference value SPR (96%), so that both the rotation-speeds of the fans FAN_1 and FAN_2 are increased by 200 rpm (4% of the rotation-speed target value SPS), wherein the adjustments and the results thereof in the above-mentioned embodiments are summarised in Table 2, in which '−' means decreasing the rotation-speed and '+' means increasing the rotation-speed.

TABLE 2

| rotation-speed value SPV_1 | rotation-speed value SPV_2 | rotation-speed reference value SPR | | parameters SPS/L1/L2 | rotation-speed adjustment value SPA |
|---|---|---|---|---|---|
| 100% | 100% | Formula (1) | 100% | rotation-speed target value SPS = 100% | 0 |
|  |  | Formula (2) | 100% |  | 0 |
|  |  | Formula (3) | 100% |  | 0 |
| 110% | 90% | Formula (1) | 100% |  | 0 |
|  |  | Formula (2) | 99.5% |  | 0 |
|  |  | Formula (3) | 102% |  | 0 |
| 90% | 110% | Formula (1) | 100% | first threshold value | 0 |
|  |  | Formula (2) | 99.5% |  | 0 |
|  |  | Formula (3) | 98% |  | 0 |
| 110% | 110% | Formula (1) | 110% | L1 = 103% | −10% |
|  |  | Formula (2) | 110% |  | −10% |
|  |  | Formula (3) | 110% |  | −10% |
| 90% | 90% | Formula (1) | 90% | second threshold value | +10% |
|  |  | Formula (2) | 90% |  | +10% |
|  |  | Formula (3) | 90% |  | +10% |
| 100% | 90% | Formula (1) | 95% | L2 = 97% | +5% |
|  |  | Formula (2) | 95% |  | +5% |
|  |  | Formula (3) | 96% |  | +4% |

Figure 2:
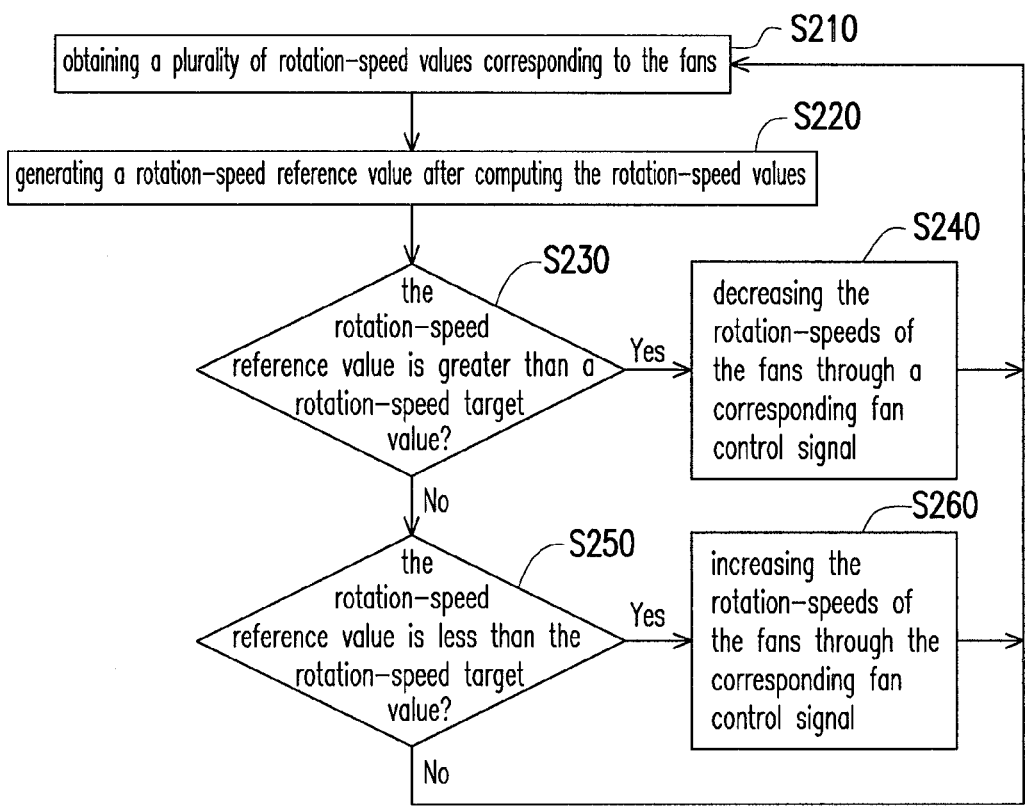
FIG. 2 is a flowchart of a control method of a heat-dissipating system according to an embodiment of the invention.

FIG. 2 is a flowchart of a control method of a heat-dissipating system according to an embodiment of the invention. Referring to FIG. 2, in the embodiment, a heat-dissipating system includes a plurality of fans mutually connected in parallel. First, a plurality of rotation-speed values corresponding to the fans are obtained (step S210) and a rotation-speed reference value is generated after computing the rotation-speed values (step S220). Next, it is judged whether or not the rotation-speed reference value is greater than a rotation-speed target value (step S230). When the rotation-speed reference value is greater than the rotation-speed target value, the judgement result by step S230 is "yes" and the rotation-speeds of the fans are decreased through a corresponding fan control signal (step S240); otherwise, when the rotation-speed reference value is not greater than the rotation-speed target value, the judgement result by step S230 is "no" and the method further judges whether or not the rotation-speed reference value is less than the rotation-speed target value (step S250).

When the rotation-speed reference value is less than the rotation-speed target value, the judgement result by step S250 is "yes" and the rotation-speeds of the fans are increased through the corresponding fan control signal (step S260); otherwise, when the rotation-speed reference value is not less than the rotation-speed target value, the judgement result by step S250 is "no" and the workflow goes back to step S210 so as to repeat the above-mentioned steps to obtain the rotation-speed values of the fans, in which after steps S240 and S260, the workflow also goes back to step S210 to repeat the above-mentioned step to obtain the rotation-speed values of the fans. The details of the above-mentioned steps can refer to the description of the heat-dissipating system 100, which is omitted to describe.

Figure 3:
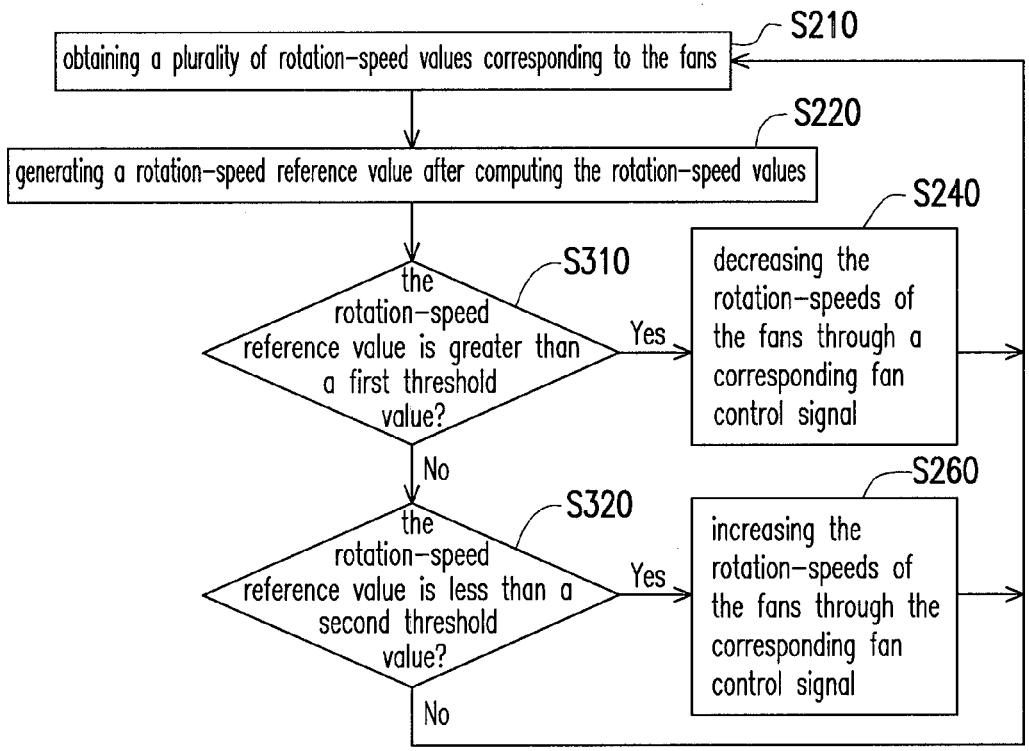
FIG. 3 is a flowchart of a control method of a heat-dissipating system according to another embodiment of the invention.

FIG. 3 is a flowchart of a control method of a heat-dissipating system according to another embodiment of the invention. Referring to FIGS. 2 and 3, the embodiment shown in FIG. 3 is similar to the embodiment shown in FIG. 2 except for steps S310 and S320. In step S310, it is judged whether or not the rotation-speed reference value is greater than a first threshold value. When the rotation-speed reference value is greater than the first threshold value, the judgement result by step S310 is "yes" and step S240 is performed; otherwise, when the rotation-speed reference value is not greater than the first threshold value, the judgement result by step S310 is "no" and step S320 is performed. In step S320, it is judged whether or not the rotation-speed reference value is less than a second threshold value. When the rotation-speed reference value is less than the second threshold value, the judgement result by step S320 is "yes" and step S260 is performed; otherwise, when the rotation-speed reference value is not less than the second threshold value, the judgement result by step S320 is "no" and step S210 is performed, in which the first threshold value is greater than the second threshold value.

In summary, the heat-dissipating system and the control method thereof in the above-mentioned embodiments of the invention are able to generate a rotation-speed reference value after computations on the rotation-speed values corresponding to a plurality of fans mutually connected in parallel. When the rotation-speed reference value is greater than a rotation-speed target value, the rotation-speeds of the fans are decreased through a corresponding fan control signal; when the rotation-speed reference value is less than the rotation-speed target value, the rotation-speeds of the fans are increased through the corresponding fan control signal. Since the rotation-speed reference value is computed out according to the rotation-speed values corresponding to the fans, the adjustment of the rotation-speeds of the fans is more accurate so as to decrease the noise of the fans and advance the average heat-dissipating effect. In another embodiment, when the rotation-speed reference value is greater than a first threshold value, the rotation-speeds of the fans are decreased through the corresponding fan control signal; when the rotation-speed reference value is less than a second threshold value, the rotation-speeds of the fans are increased through the corresponding fan control signal, in which the first threshold value is greater than the second threshold value and the rotation-speed target value is between the first threshold value and second threshold value. Since the first threshold value is different from the second threshold value, so that when the rotation-speed reference value is close to the rotation-speed target value, the invention can avoid the additional system burden caused by frequently adjusting the rotation-speeds of the fans.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A heat-dissipating system, comprising:
a plurality of fans, mutually connected in parallel;
a plurality of rotation-speed detection units, respectively coupled to the corresponding fans for detecting and outputting a plurality of rotation-speed values corresponding to the fans;
a fan driver, coupled to the fans for generating a fan control signal to control rotation-speeds of the fans; and
an operation unit, coupled to the rotation-speed detection units and the fan driver, the operation unit receiving and calculating the rotation-speed values to generate a rotation-speed reference value, and controlling the fan driver to generate the corresponding fan control signal according to the rotation-speed reference value;
wherein when the rotation-speed reference value is greater than a first threshold value, the fan driver decreases the rotation-speeds of the fans through the corresponding fan control signal; when the rotation-speed reference value is less than a second threshold value, the fan driver increases the rotation-speeds of the fans through the corresponding fan control signal.

2. The heat-dissipating system claimed in claim 1, wherein the rotation-speed reference value is an average value of the rotation-speed values.

3. The heat-dissipating system claimed in claim 1, wherein the rotation-speed reference value is an n-th root of a product of the rotation-speed values, wherein n is quantity of the fans.

4. The heat-dissipating system claimed in claim 1, wherein the fans respectively have a corresponding weight value, and the rotation-speed reference value is a quotient of the sum of the products of the rotation-speed values and the corresponding weight values divided by the sum of all the weight values.

5. The heat-dissipating system claimed in claim 4, wherein each of the weight values is obtained by computation according to a proportion of heat-dissipating capability and a proportion of noise influence of the corresponding fan in the heat-dissipating system.

6. The heat-dissipating system claimed in claim 4, wherein the sum of the weight values is 1.

7. The heat-dissipating system claimed in claim 1, wherein the first threshold value is greater than the second threshold value.

8. The heat-dissipating system claimed in claim 1, wherein the first threshold value is equal to the second threshold value.

9. The heat-dissipating system claimed in claim 1, further comprising a rotation-speed target value, wherein a difference between the rotation-speed target value and the rotation-speed reference value is a rotation-speed adjustment value of the fans and the fan control signal corresponds to the rotation-speed adjustment value for adjusting the rotation-speeds of the fans.

10. A control method of a heat-dissipating system, wherein the heat-dissipating system has a plurality of fans mutually connected in parallel and the control method comprises:
    obtaining a plurality of rotation-speed values corresponding to the fans;
    generating a rotation-speed reference value after computing the rotation-speed values;
    decreasing the rotation-speeds of the fans through a corresponding fan control signal when the rotation-speed reference value is greater than a first threshold value; and
    increasing the rotation-speeds of the fans through the corresponding fan control signal when the rotation-speed reference value is less than a second threshold value.

11. The control method of heat-dissipating system claimed in claim 10, wherein the rotation-speed reference value is an average value of the rotation-speed values.

12. The control method of heat-dissipating system claimed in claim 10, wherein the rotation-speed reference value is an n-th root of a product of the rotation-speed values, wherein n is quantity of the fans.

13. The control method of heat-dissipating system claimed in claim 10, wherein the fans respectively have a corresponding weight value, and the rotation-speed value is a quotient of the sum of the products of the rotation-speed values and the corresponding weight values divided by the sum of all the weight values.

14. The control method of heat-dissipating system claimed in claim 13, wherein each of the weight values is obtained by computation according to a proportion of heat-dissipating capability and a proportion of noise influence of the corresponding fan in the heat-dissipating system.

15. The control method of heat-dissipating system claimed in claim 13, wherein the sum of the weight values is 1.

16. The control method of heat-dissipating system claimed in claim 10, wherein the first threshold value is greater than the second threshold value.

17. The control method of heat-dissipating system claimed in claim 10, wherein the first threshold value is equal to the second threshold value.

18. The control method of heat-dissipating system claimed in claim 10, further comprising a rotation-speed target value, wherein a difference between the rotation-speed target value and the rotation-speed reference value is a rotation-speed adjustment value of the fans and the fan control signal corresponds to the rotation-speed adjustment value for adjusting the rotation-speeds of the fans.

\* \* \* \* \*